US011938720B2

(12) United States Patent
Kakimoto et al.

(10) Patent No.: US 11,938,720 B2
(45) Date of Patent: Mar. 26, 2024

(54) PRINTING APPARATUS HAVING A SPLICE PORTION

(71) Applicant: SCREEN HOLDINGS CO., LTD., Kyoto (JP)

(72) Inventors: Shoji Kakimoto, Kyoto (JP); Mitsuru Tanemoto, Kyoto (JP); Hideaki Onishi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/587,414

(22) Filed: Jan. 28, 2022

(65) Prior Publication Data

US 2022/0274429 A1 Sep. 1, 2022

(30) Foreign Application Priority Data

Feb. 26, 2021 (JP) ................................ 2021-030443
Dec. 24, 2021 (JP) ................................ 2021-210829

(51) Int. Cl.

*B41J 15/16* (2006.01)
*B41J 11/00* (2006.01)
*B41J 13/00* (2006.01)
*B41J 29/377* (2006.01)

(52) U.S. Cl.

CPC ........... *B41J 15/165* (2013.01); *B41J 11/002* (2013.01); *B41J 11/0095* (2013.01); *B41J 13/0009* (2013.01); *B41J 29/377* (2013.01); *B41J 15/16* (2013.01)

(58) Field of Classification Search

CPC .... B41J 15/165; B41J 11/002; B41J 11/0095; B41J 13/0009; B41J 29/377; B41J 15/16

See application file for complete search history.

(56) References Cited

FOREIGN PATENT DOCUMENTS

| | | | | |
|---|---|---|---|---|
| JP | 2008290849 | * | 12/2008 | ............. B65H 19/18 |
| JP | 2013103383 | * | 5/2013 | ................ B41J 2/01 |
| JP | 2016172339 | * | 9/2016 | ............. B41J 11/14 |
| JP | 6415364 B | | 10/2018 | |

* cited by examiner

*Primary Examiner* — Henok D Legesse
(74) *Attorney, Agent, or Firm* — Rimon P.C.

(57) ABSTRACT

A printing apparatus for printing on printing media in a continuous business form. The apparatus includes a transport device, a detector for detecting a splice portion between the printing media transported by the transport device, a printing section for printing on the printing media transported by the transport device, a drying section for drying at a drying temperature the printing media printed in the printing section and transported by the transport device, and a controller for operating the transport device to reduce tension applied to the splice portion at least while the splice portion is located in the drying section.

12 Claims, 7 Drawing Sheets

PRINTING APPARATUS HAVING A SPLICE PORTION

BACKGROUND OF THE INVENTION

(1) Field of the Invention

This invention relates to a printing apparatus for printing on printing media in a continuous form (also called conform), and more particularly to a technique for printing on printing media having a splice portion which is a joint between the printing media.

(2) Description of the Related Art

Conventionally, some apparatus of this type are known to print on web paper among printing media in continuous forms. See Japanese Patent No. 6415364, for example. The web paper is installed in a roll form in a sheet feeder. When a preceding roll of web paper is exhausted, a joint between the rear end of the web paper in the preceding roll and the front end of web paper in a following roll is connected by a splicer device. This joint portion is hereinafter called the splice portion. Then, the web paper of the following roll is fed to a printing station, following the web paper of the preceding roll, and a printing process is continuously performed on the preceding roll and the following roll.

Since the splice portion is a location where the two lengths of web paper are joined together by adhesive tape or the like applied thereto, its strength is low compared with other portions. Consequently, the splice portion can be torn, peeled, or otherwise damaged by tension or heat. When damage occurs to the web paper, the transport path will need to be loaded with web paper, for example, which will require time for re-printing. Thus, while the splice portion stays between the sheet feeder and a takeup roller, the conventional apparatus transports the web paper at reduced transporting speed. This prevents damage to the splice portion.

However, the conventional example with such a construction has the following problems.

That is, the conventional apparatus transports the web paper at reduced transporting speed throughout the time the splice portion travels from the sheet feeder to the takeup roller. This presents a problem of lowering the productivity of prints. Further, since a printing process is carried out at the transporting speed remaining reduced, a lowering of printing quality is inevitable due to dry conditions or differences in ink dispensing timing.

SUMMARY OF THE INVENTION

This invention has been made having regard to the state of the art noted above, and its object is to provide a printing apparatus capable of preventing damage to the splice portion without lowering the productivity of prints.

To fulfill the above object, this invention provides the following construction.

This invention provides a printing apparatus for printing on printing media in a continuous form, the apparatus comprising a transport device for transporting the printing media; a detector for detecting a splice portion which is a joint between the printing media transported by the transport device; a printing section for printing on the printing media transported by the transport device; a drying section for drying at a drying temperature the printing media printed in the printing section and transported by the transport device; and a controller for operating the transport device to reduce tension applied to the splice portion at least while the splice portion is located in the drying section.

According to this invention, while the splice portion of the printing media transported by the transport device and detected by the detector is located in the drying section, the controller controls the transport device to reduce the tension applied to the splice portion without changing the transporting speed of the printing media. Although the splice portion is vulnerable to heat and low in strength, the above operation can prevent damage to the splice portion without lowering the productivity of prints.

In this invention, it is preferred that the controller is configured to operate the transport device to reduce the tension applied to the splice portion at a point of time the splice portion moves out of the printing section.

The controller reduces the tension applied to the splice portion at a point of time the splice portion moves out of the printing section. Consequently, the tension applied to the splice portion is reduced before the splice portion reaches the drying section. Thus, when the splice portion reaches the drying section, the tension applied to the splice portion can be reduced reliably, thereby to prevent damage to the splice portion reliably.

In this invention, it is preferred that the apparatus further comprises a cooling section disposed downstream of the drying section for cooling the printing media dried in the drying section, wherein the controller is configured to operate the transport device to reduce the tension applied to the splice portion while the splice portion is located in the cooling section.

The cooling section by reason of construction applies increased tension to the printing media. So, the controller reduces the tension applied to the splice portion while the splice portion is located in the cooling section. This can prevent damage to the splice portion in the cooling section.

In this invention, it is preferred that the controller is configured to operate the drying section to lower the drying temperature while the splice portion is located in the drying section.

The splice portion is vulnerable to heat and low in strength. However, since the drying temperature is lowered while the splice portion is located in the drying section, damage due to heat to the splice portion can be prevented in the drying section.

In this invention, it is preferred that the controller is configured to operate the transport device to return the tension in the drying section to a former level after the splice portion passes the drying section.

The above allows the printing medium located upstream of the splice portion to be transported to the drying section in a condition well suited for drying. The drying process in the drying section can therefore be carried out efficiently.

In this invention, it is preferred that the controller is configured to operate the transport device to return the tension in the cooling section to a former level after the splice portion passes the cooling section.

The above allows the printing medium located upstream of the splice portion to be transported to the cooling section in a condition well suited for cooling. The cooling process in the cooling section can therefore be carried out efficiently.

In this invention, it is preferred that the detector comprises an auto splicer for creating the spliced portion at a joint between old web paper and new web paper, and outputting a splice signal to the controller.

Since the detector comprises the auto splicer, there is no need for the detector as a separate entity. Thus, the construction can be simplified to realize reduced cost.

In another aspect of the invention, a printing apparatus is provided for printing on printing media in a continuous form, the apparatus comprising a transport device for transporting the printing media; a detector for detecting a splice portion which is a joint between the printing media transported by the transport device; a printing section for printing on the printing media transported by the transport device; a drying section for drying at a drying temperature the printing media printed in the printing section and transported by the transport device; and a controller for operating the drying section to lower the drying temperature at least while the splice portion is located in the drying section.

According to this invention, while the splice portion of the printing media transported by the transport device and detected by the detector is located in the drying section, the controller controls the drying section to lower the drying temperature without changing the transporting speed of the printing media. Although the splice portion is vulnerable to heat and low in strength, the above operation can prevent damage to the splice portion without lowering the productivity of prints.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Embodiments of this invention will be described hereinafter.

Embodiment 1

Embodiment 1 of this invention will be described hereinafter with reference to the drawings.

Figure 1:
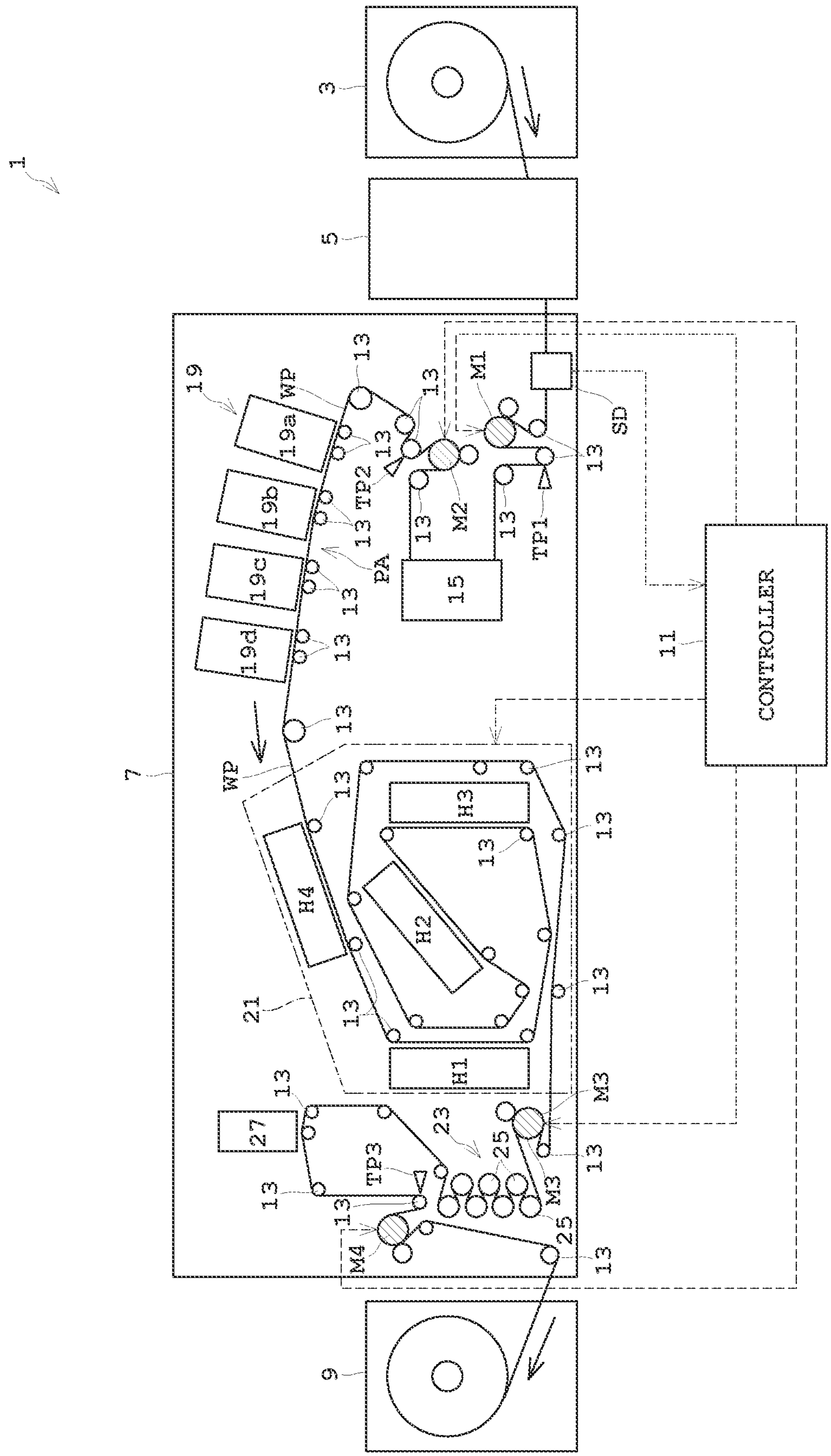
FIG. 1 is a schematic overall view of a printing apparatus according to Embodiment 1.
Figure 2:
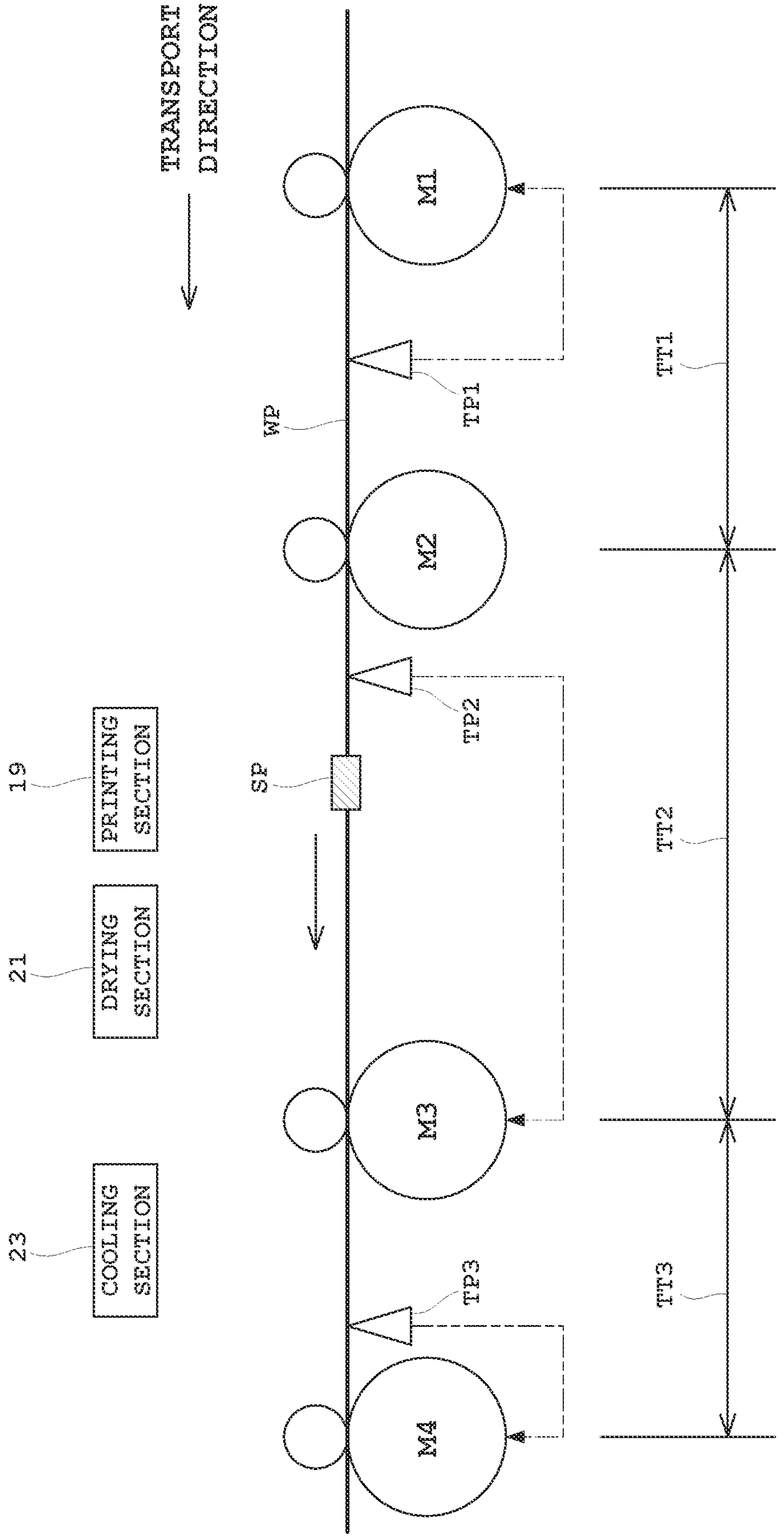
FIG. 2 is a schematic view showing a tension control system.

FIG. 1 is a schematic overall view of a printing apparatus according to Embodiment 1. FIG. 2 is a schematic view showing a tension control system.

A printing apparatus 1 according to this embodiment is an inkjet type printing apparatus for performing printing by dispensing ink droplets, for example. The printing apparatus 1 includes a sheet feeder 3, an auto splicer 5, an inkjet printing apparatus 7, a takeup roller 9, and a controller 11.

The sheet feeder 3 holds web paper WP in a roll form to be rotatable about a horizontal axis, for example. The sheet feeder 3 unwinds the web paper WP and feeds it in the transport direction to the inkjet printing apparatus 7. The auto splicer 5 is disposed between the sheet feeder 3 and inkjet printing apparatus 7. The auto splicer 5, by the time the web paper WP in the sheet feeder 3 is exhausted, unites joints at its terminal end and a leading end of new web paper WP not shown. The union is provided by adhesive tape, for example. This joint portion is called a splice portion. Compared with other portions, this splice portion is low in strength and is also vulnerable to heat.

The inkjet printing apparatus 7 prints images by dispensing ink droplets to the web paper WP unwound from the sheet feeder 3 through the auto splicer 5. The inkjet printing apparatus 7 performs a process of drying printed web paper WP, and then performs a process of cooling the web paper WP. The inkjet printing apparatus 7 performs a process of inspecting the web paper WP on which the cooling process has been done. The takeup roller 9 winds the printed web paper WP on a horizontal axis. The controller 11 carries out overall control of the inkjet printing apparatus 7 described above.

The above web paper WP corresponds to the "printing media" in this invention. The inkjet printing apparatus 7 corresponds to the "printing apparatus" in this invention.

The inkjet printing apparatus 7 includes a first drive roller M1 disposed in an upstream position for taking in the web paper WP from the sheet feeder 3 and auto splicer 5. The web paper WP unwound by the first drive roller M1 is transported along freely rotatable transport rollers 13 and other components downstream toward the takeup roller 9. A detector SD is disposed upstream of the first drive roller M1 for detecting a splice portion SP formed on the web paper WP. The detector SD detects the splice portion SP by detecting the thickness of the web paper WP and/or distinguishing the color of web paper WP, An edge position controller 15 is disposed downstream of the first drive roller M1. The edge position controller 15 automatically adjusts the web paper WP when the latter meanders in directions perpendicular to the transport direction, thus controlling the web paper WP to be transported in the right position in width directions perpendicular to the transport direction A second drive roller M2 is disposed downstream of the edge position controller 15. The web paper WP fed downstream by the second drive roller M2 has its transport direction changed to a substantially horizontal position by a transport roller 13 disposed downstream of the second drive roller M2 to travel to a printing area PA along a transport path. This transport roller 13 has a rotary encoder, not shown, attached thereto. The rotary encoder outputs signals to the controller 11. Based on the signals from the rotary encoder, the controller 11 can determine transporting speeds and positions of the web paper WP. The printing area PA has a plurality of transport rollers 13 arranged therein along the transport path of the web paper WP.

A printing section 19 is disposed above the printing area PA. The printing section 19 includes four inkjet heads **19*a*-19*d*, for example. The most upstream inkjet head 19*a* dispenses ink droplets in black (K), the next inkjet head 19*b* dispenses ink droplets in cyan (C), the next inkjet head 19*c* dispenses ink droplets in magenta (M), and the next inkjet head 19*d* dispenses ink droplets in yellow (Y), for example. The inkjet heads 19*a*-19*d*** are arranged separately at predetermined intervals in the transport direction of the web paper WP.

The web paper WP printed in the printing area PA has its transport direction changed by a transport roller 13 located downstream. A drying section 21 is disposed in this position. The drying section 21 has transport rollers 13 arranged to transport the web paper WP spirally. The drying section 21 has four heating units H1-H4, for example. The four heating units H1-H4 heat the web paper WP guided by the transport rollers 13. The four heating units H1-H4 are arranged along the transport path of the web paper WP in the order of heating unit H4, heating unit H1, heating unit H2, and heating unit H3. The heating units H1-H4 heat the web paper WP in a non-contact state. Each of the heating units H1-H4 has a plurality of carbon heaters for emitting infrared radiation, for example. The drying section 21 has a drying temperature controlled by the controller 11.

A drive roller M3 is disposed downstream of the drying section 21. A cooling section 23 is disposed downstream of the drive roller M3. The cooling section 23 includes a plurality of cooling rollers 25, for example. Specifically, the cooling rollers 25 have a coolant (e.g. cooling water) circulating inside. In order to circulate the coolant inside, inlets and outlets of the coolant are formed in rotary shafts not shown. The cooling rollers 25 have a characteristic of large inertia compared with the transport rollers 13 which are other driven rollers. In the cooling section 23, therefore, the web paper WP tends to come under load at the time of transportation. The cooling section 23 cools the web paper WP heated in the drying section 21 by making the web paper WP contact outer circumferential surfaces of the cooling rollers 25.

Downstream of the cooling section 23, the web paper WP is changed to a substantially horizontal position by a plurality of transport rollers 13. An inspecting device 27 is disposed in this area. The inspecting device 27 inspects images printed in the printing section 19.

A drive roller M4 is disposed downstream of the inspecting device 27. The web paper WP transported by the drive roller M4 has its direction changed by a transport roller 13, and is rolled up on the takeup roller 9.

The above drive rollers M1-M4 are rotated by motors not shown. The drive rollers M1-M4 are formed of pinch rollers. Each pinch roller is formed of a large diameter roller and a small diameter roller, and clamps the web paper WP by pressing the small diameter roller on the large diameter roller, for example. A tension sensor TP1 is provided for a transport roller 13 located between the drive roller M1 and drive roller M2 and downstream of and close to the drive roller M1. A tension sensor TP2 is provided for a transport roller 13 located between the drive roller M2 and drive roller M3 and downstream of and close to the drive roller M2. A tension sensor TP3 is provided for a transport roller 13 located between the drive roller M3 and drive roller M4 and upstream of and close to the drive roller M4.

The above transport rollers 13 and drive rollers M1-M4 correspond to the "transport device" in this invention.

The controller 11 is formed of a CPU, a memory, and so on not shown. The controller 11 performs overall control of the inkjet printing apparatus 7. The controller 11 receives print data from a computer not shown. The controller 11 carries out printing by operating various components according to designated printing conditions (e.g. resolution, transporting speed, tension, drying temperature, and so on) based on the print data received. The controller 11 operates the drive rollers M-M4 and controls transportation of the web paper WP at a predetermined transporting speed and tension according to the printing conditions. The controller 11 operates the drying section 21 to perform a drying process at a predetermined drying temperature according to the printing conditions.

The controller 11 controls each of the drive rollers M1-M4 according to printing conditions. In that case, feedback control is done as shown in FIG. 2. The drive roller M2 is called a reference drive roller. That is, the drive roller M2 is operated to be constant at the transporting speed according to the printing conditions. The drive rollers M1, M3, and M4 other than the drive roller M2 acting as the reference drive roller are operated under the feedback control based on the tension sensors TP1-TP3. That is, tension applied to the web paper WP is specified in the printing conditions. The controller 11 controls the drive of each of the drive rollers M1, M3, and M4 to be a specified target tension value.

Specifically, the controller 11 operates the drive roller M1 so that a target tension value TT1 in the printing conditions and a tension detection value of the tension sensor TP1 may be in agreement. The controller 11 operates the drive roller M3 so that a target tension value TT2 in the printing conditions and a tension detection value of the tension sensor TP2 may be in agreement. The controller 11 operates the drive roller M4 so that a target tension value TT3 in the printing conditions and a tension detection value of the tension sensor TP3 may be in agreement. Consequently, in the area between the drive roller M1 and drive roller M2, tension is controlled to be at the target tension value TT1. In the area between the drive roller M2 and drive roller M3, where the printing section 19 and drying section 21 are located, tension is controlled to have the target tension value TT2. In the area between the drive roller M3 and drive roller M4, where the cooling unit 23 is located, tension is controlled to have the target tension value TT3.

Even when the transporting speed of the web paper WP is designated by V1 in the predetermined printing conditions and the tension in the three areas is controlled, the transporting speed V1 becomes constant. When, for example, of the drive roller M1 and drive roller M2, the rotational frequency of the drive roller M1 is increased, the tension detection value of the tension sensor TP1 will be lowered. However, the rotational frequency of the drive roller M2 which is the reference drive roller is constant, and thus the transporting speed of the web paper WP is constant at V1. Conversely, when the rotational frequency of drive roller M1 is decreased, the tension detection value of the tension sensor TP1 will become larger, but the transporting speed of the web paper WP is constant at V1. Such relationship is in effect also for the area between the drive roller M2 and drive roller M3 and the area between the drive roller M3 and drive roller M4.

The detector SD, upon detection of the splice portion SP of the web paper WP, outputs a detection signal to the controller 11. From a point of time of receiving the detection signal and the transporting speed in the predetermined printing conditions, the controller 11 can determine which position the splice portion SP is in the inkjet printing apparatus 7. That is, the controller 11 can determine whether the splice portion SP formed on the web paper WP is in the printing area PA directly under the printing section 19, or in the drying section 21, or in the cooling section 23.

Figure 3:
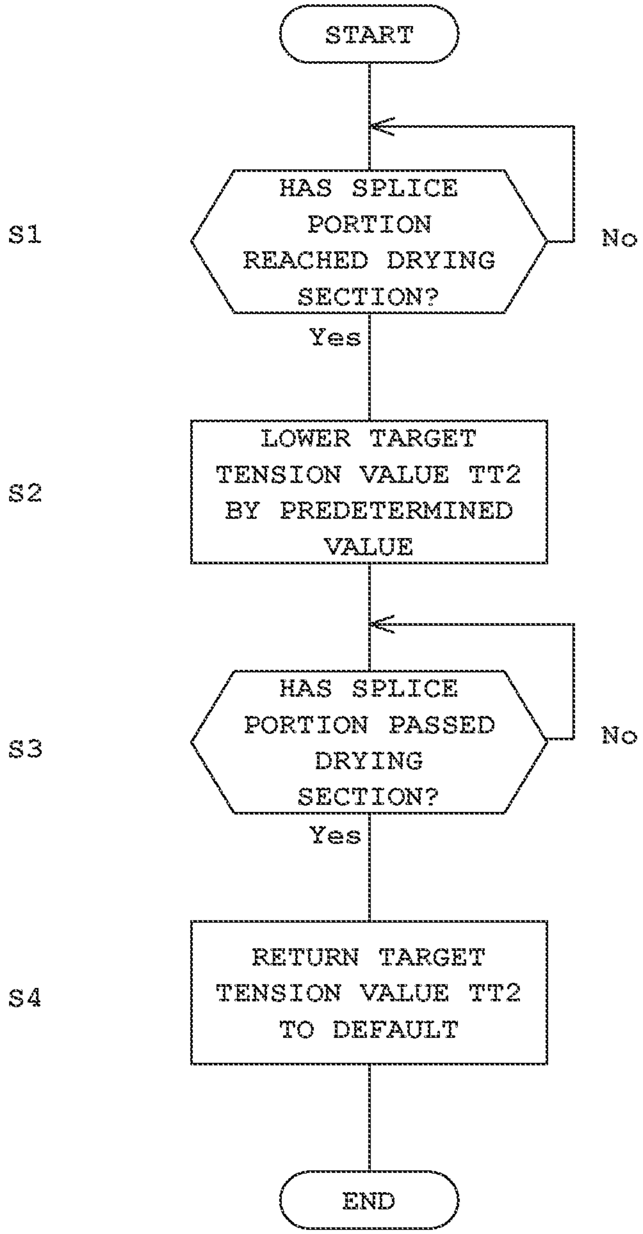
FIG. 3 is a flow chart showing an example of control at the time of printing on web paper including a splice portion.

The controller 11 in this embodiment has its characteristic point in controlling tension in response to positions of the splice portion SP. This will be described specifically with reference to FIG. 3. FIG. 3 is a flow chart showing an example of control at the time of printing on the web paper WP including the splice portion SP. It is assumed that the predetermined printing conditions are set beforehand and that, for example, the web paper WP is transported at the transporting speed (=V1) and with target tension values TT1-TT3=20 kg. The splice portion SP is assumed to have been formed on the web paper WP by the auto splicer 5.

Step S1

The controller 11 determines, from the timing of the splice portion SP detected by the detector SD and the printing conditions, whether or not the splice portion SP is located in the drying section 21. When the controller 11 determines that the splice portion SP is located in the drying section 21, the process moves to the following step S2.

Step S2

The controller 11 reduces the target tension value TT2 by a predetermined value α. For example, a reduction is made by a predetermined value α=2 kg (10% of a default value). Consequently, the controller 11 reduces only the target tension value TT2 from 20 kg to 18 kg. Specifically, the controller 11 lowers the rotational frequency of the drive rollers M3 and M4.

Step S3

The controller 11 branches the process by whether or not the splice portion SP has passed the drying section 21. While the splice portion SP is in the drying section 21, the checking in step S3 is repeated. When the splice portion SP has passed the drying section 21, the process moves to the following step S4.

Step S4

The controller 11 returns the target tension value TT2 to the default value. That is, the controller 11 returns the target tension value TT2 from 18 kg to the original 20 kg. Consequently, the web paper WP located upstream of the splice portion SP can be transported to the drying section 23 in a state well suited for drying. Thus, the drying process of the web paper WP in the drying section 23 can be carried out efficiently.

Figure 4:
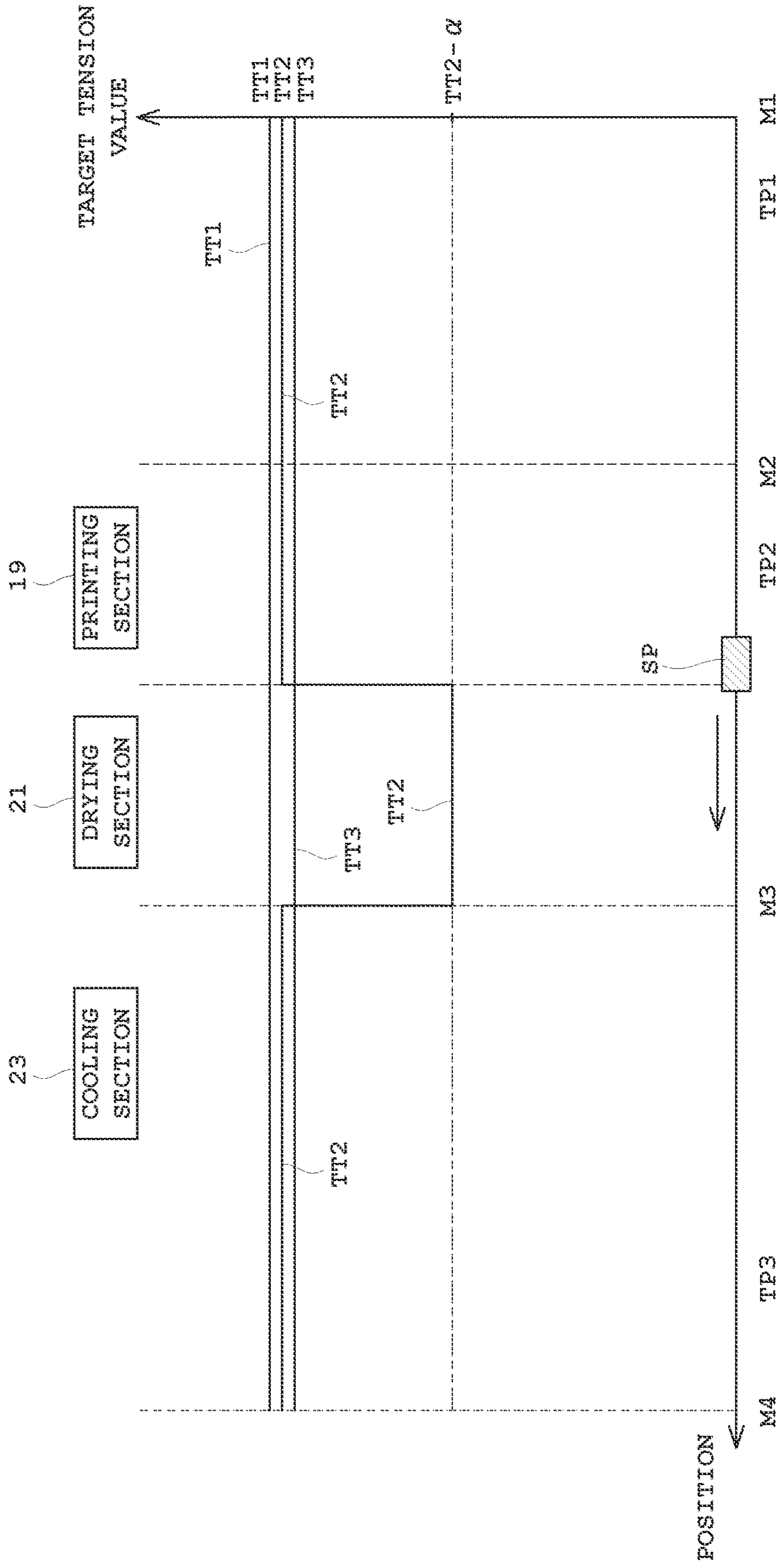
FIG. 4 is a view showing an example of tension transition.

Reference is now made to FIG. 4. FIG. 4 is a view showing an example of tension transition. Although altogether the same values, FIG. 4 depicts the target tension values TT1-TT3 as shifted vertically in order to facilitate identification of each.

With the above control of tension by the controller 11, the target tension values TT1 and TT3 are invariable wherever the splice portion SP may be. That is, these values remain as set in the printing conditions. In the case of the target tension value TT2, on the other hand, tension is reduced by the predetermined value while the splice portion SP is located in the drying section 21. And when the splice portion SP has passed the drying section 21, the target tension value TT2 is returned to the default value. In other words, the predetermined value is added to the target tension value TT2.

According to this embodiment, while the splice portion SP of the web paper WP in transportation detected by the detector SD is located in the drying section 21, the controller 11 controls the drive roller M3 to reduce the tension given to the splice portion SP without changing the transporting speed of the web paper WP. Although the splice portion SP is vulnerable to heat and low in strength, the above operation can prevent damage to the splice portion SP without lowering the productivity of prints obtained by printing images on the web paper WP. The transporting speed also remains invariable. Thus, since there occurs no difference in the drying state or ink dispensing timing, the lowering of printing quality can also be prevented.

In the foregoing embodiment, control is executed to reduce tension only when the splice portion SP is located in the drying section 21. However, this invention is not limited to such embodiment, but may be modified as follows.

(1) In the foregoing embodiment, while the splice portion SP is located in the drying section 21, the target tension value TT2 is reduced. In this invention, however, the target tension value TT2 may be reduced at a point of time the splice portion SP moves out of the printing section 19.

Depending on the transporting speed of the web paper WP, a delay may occur to the tension actually applied even if the target tension value TT2 is reduced when the splice portion SP reaches the drying section 21. So, the target tension value TT2 is reduced by using the point of time of moving out of the printing section 19 as trigger. This will eliminate such an inconvenience since the target tension value is lowered a little early.

(2) As noted hereinbefore, the cooling section 23 by reason of construction imposes load on the web paper WP. So, while the splice portion SP is located in the cooling section 23, the target tension value TT3 may be reduced by the predetermined value. This can prevent damage to the splice portion SP in the cooling section 23. Similarly to the above example of drying section 21, it is preferable to return the target tension value TT3 to the default value after the splice portion SP passes the cooling section 23. Consequently, the web paper WP located upstream of the splice portion SP can be transported to the cooling section 23 in a state well suited for cooling. The cooling process can therefore be carried out efficiently in the cooling section 23.

Figure 5:
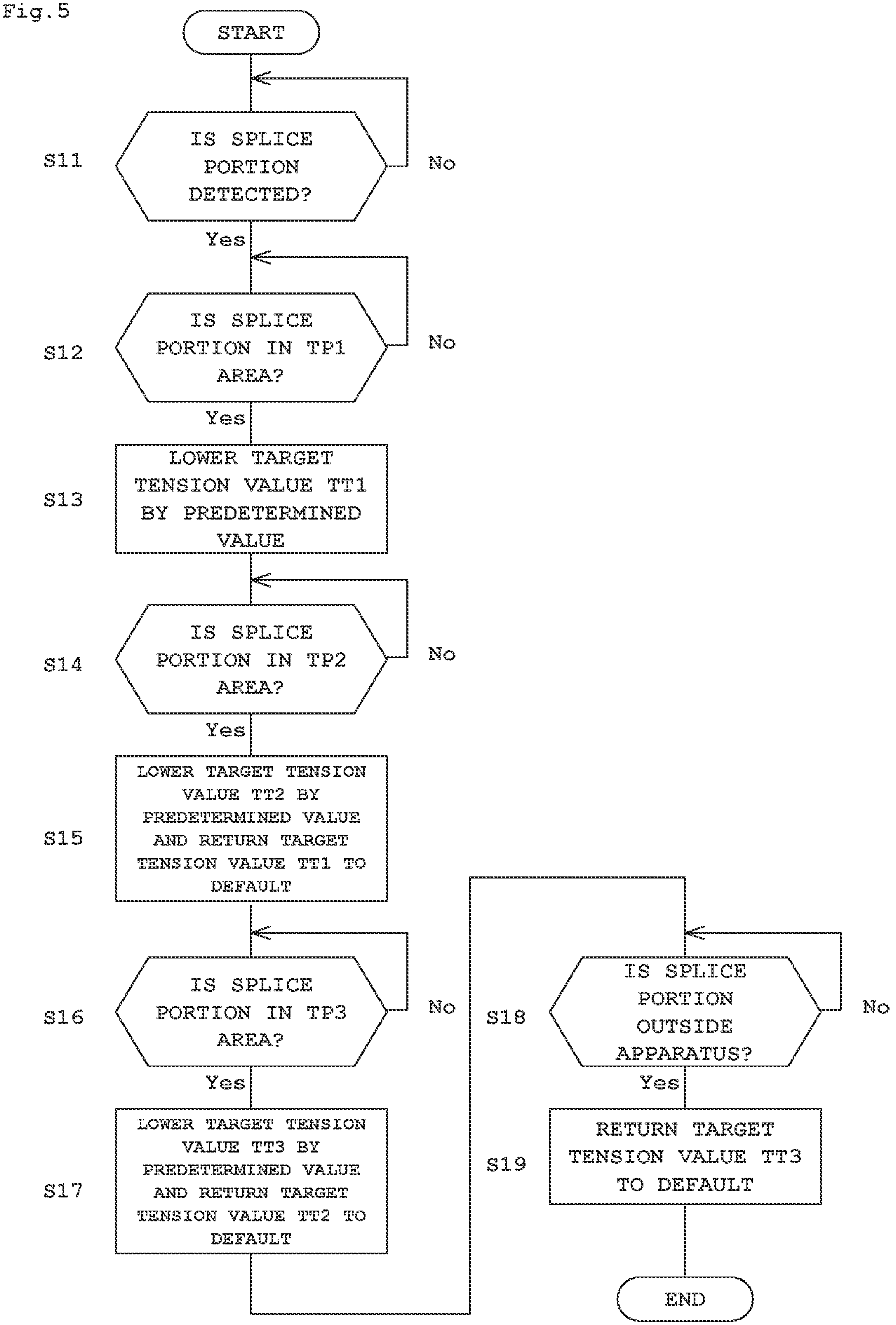
FIG. 5 is a flow chart showing another example of control at the time of printing on the web paper including the splice portion.

(3) In the foregoing embodiment, tension is reduced only in the area of drying section 21 or/and cooling section 23. In this invention, however, tension may be reduced in each area successively according to the position of the splice portion SP. Specifically, the process may be carried out as shown in FIG. 5, for example. FIG. 5 is a flow chart showing another example of control at the time of printing on the web paper WP including the splice portion SP. In accordance with the tension sensors TP1-TP3, the area between the drive roller M1 and drive roller M2 will be called TP1 area, the area between the drive roller M2 and drive roller M3 will be called TP2 area, and the area between the drive roller M3 and drive roller M4 will be called TP3 area.

Step S11

The controller 11 repeatedly executes step S11 until the detector SD detects the splice portion SP. When the splice portion SP is detected, the process moves to step S12.

Step S12

The controller 11 branches the process by whether or not the splice portion SP is in the TP1 area.

Step S13 The controller 11, upon determining that the splice portion SP is in the TP1 area, reduces the target tension value TT1 by predetermined value.

Step S14 The controller 11 branches the process by whether or not the splice portion SP is in the TP2 area.

Step S15

The controller 11, upon determining that the splice portion SP is in the TP2 area, reduces the target tension value TT2 by predetermined value. Further, the controller 11 returns the target tension value TT1 to the default value.

Step S16

The controller 11 branches the process by whether or not the splice portion SP is in the TP3 area.

Step S17

The controller 11, upon determining that the splice portion SP is in the TP3 area, reduces the target tension value TT3 by predetermined value. Further, the controller 11 returns the target tension value TT2 to the default value.

Step S18

The controller 11 branches the process by whether or not the splice portion SP has moved outside the inkjet printing apparatus 7.

Step S19

The controller 11, upon determining that the splice portion SP is outside the inkjet printing apparatus 7, returns the target tension value TT3 to the default value.

Figure 6:
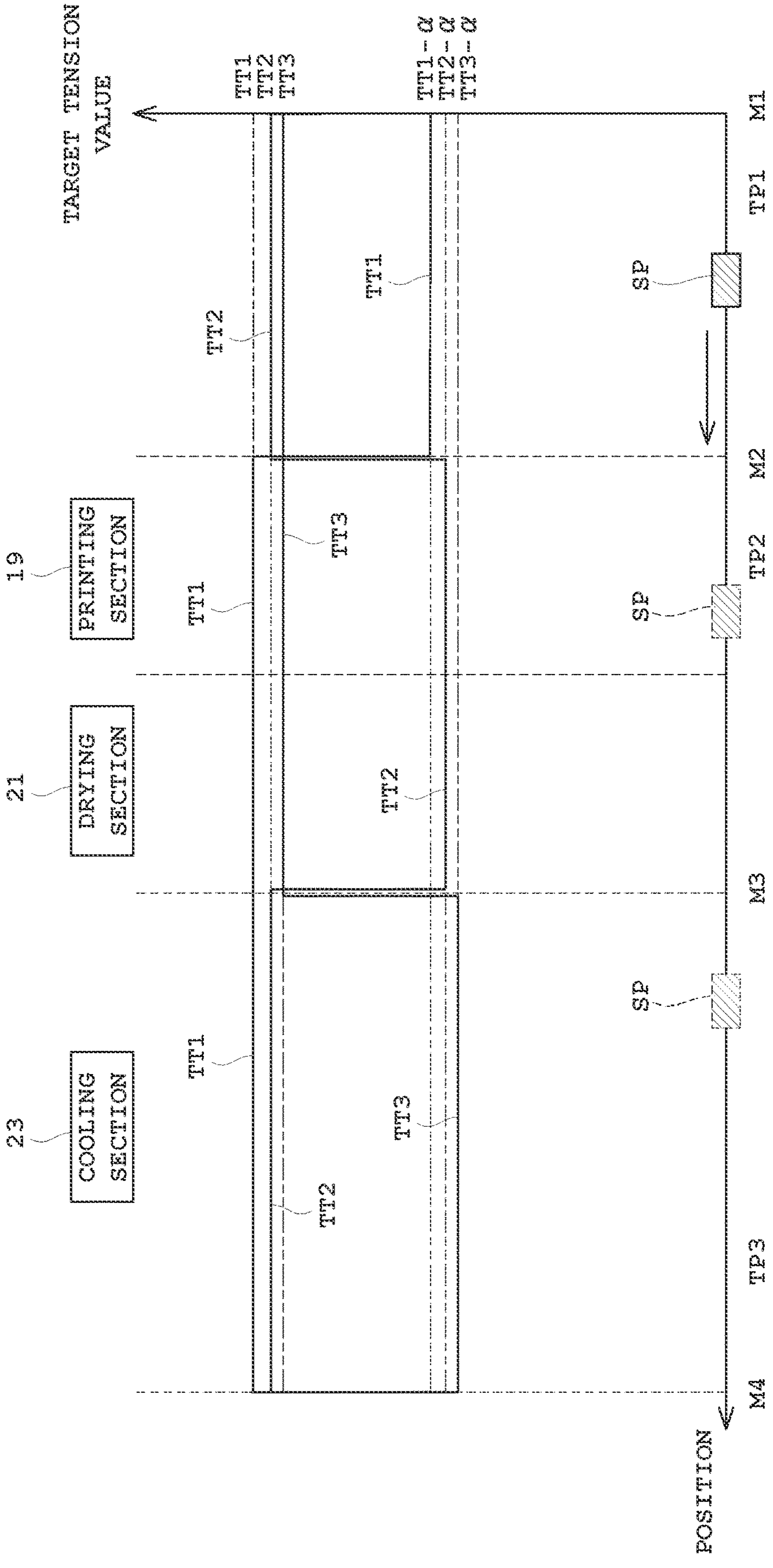
FIG. 6 is a view showing an example of tension transition.

When tension is controlled in this way, the tension will change as shown in FIG. 6. FIG. 6 is a view showing an example of tension transition. Although altogether the same values, FIG. 6 depicts the target tension values TT1-TT3 as shifted vertically in order to facilitate identification of each. This can prevent damage to the splice portion SP in each of the TP1-TP3. Further, the tension is returned to the default value in the places where the splice portion SP has passed, the process can be carried out appropriately in each place upstream of the splice portion SP.

(4) Attention has been directed only to tension in the foregoing embodiment. However, attention may be directed to the drying temperature in the drying section 21.

Specifically, when the splice portion SP is located in the drying section 21, the controller 11 lowers the drying temperature of the drying section 21 along with the reduction of the target tension value TT2. The splice portion SP is vulnerable to heat and low in strength. However, since the drying temperature is lowered while the splice portion SP is located in the drying section 21, damage due to heat can be prevented in the drying section 21. It is of course preferable to return the drying temperature of the drying section 21 to the default value after the splice portion SP passes the drying section 21.

Embodiment 2

Next, Embodiment 2 of this invention will be described with reference to the drawing. Since the construction of the printing apparatus 1 itself is the same as in foregoing Embodiment 1, a detailed description of the construction is omitted.

Figure 7:
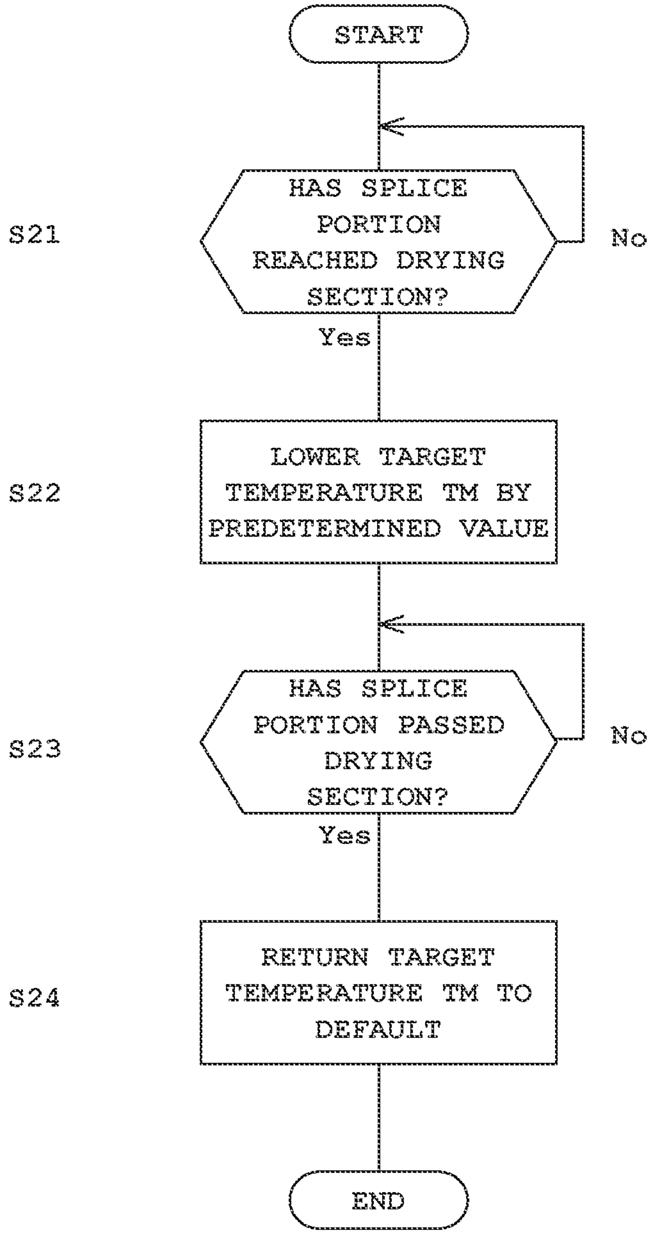
FIG. 7 is a flow chart showing an example of control in a printing apparatus according to Embodiment 2.

Here reference is made to FIG. 7. FIG. 7 is a flow chart showing an example of control in the printing apparatus according to Embodiment 2. The controller 11 operates each component in predetermined printing conditions set beforehand. It is assumed that the drying section 23 is operated at a target temperature TM to realize a drying temperature provided in the printing conditions.

Step S21

The controller 11 determines whether or not the splice portion SP has reached the drying section 21.

Step S22

The controller 11, upon determining that the splice portion SP has reached the drying section 21, lowers the target temperature TM in the drying section 21 by a predetermined value β. Taking into consideration a delay until the temperature actually lowers from the target temperature TM, the target temperature TM may be lowered by the predetermined value β at a point of time the splice portion SP moves out of the printing section 19.

Step S23

The controller 11 determines whether or not the splice portion SP has passed the drying section 21.

Step S24

The controller 11, when the splice portion SP is determined to have passed the drying section 21, returns the target temperature TM in the drying section 21 to the default value.

According to this embodiment, of the web paper WP transported by the drive rollers M1-M4 and transport rollers 13, while the splice portion SP detected by the detector SD is located in the drying section 21, the controller 11 controls the drying section 21 to lower the drying temperature without changing the transporting speed of the web paper WP. Although the splice portion SP is vulnerable to heat and low in strength, the above operation can prevent damage to the splice portion SP without lowering the productivity of prints.

In this embodiment, only the drying temperature in the drying section 21 is reduced. However, according to the places in which the splice portion SP is located, the reduction of tension may also be carried out in each place as in foregoing Embodiment 1.

This invention is not limited to the foregoing embodiments, but may be modified as follows:

(1) In foregoing Embodiments 1 and 2, the web paper WP is used as an example of printing media, this invention is not limited to such printing media. For example, plastic film may be used as printing media.

(2) In foregoing Embodiments 1 and 2, the drying section 21 includes heating units H1-H4. However, this construction may be replaced with heating rollers for drying the web paper WP wound on the outer circumferential surfaces thereof.

(3) Foregoing Embodiments 1 and 2 illustrate the construction including the auto splicer 5. However, this invention does not require the auto splicer 5 as indispensable.

(4) In foregoing Embodiments 1 and 2, printing is done by the inkjet printing apparatus 7, but this invention does not require inkjet printing as indispensable. That is, any construction is applicable as long as it is a printing apparatus that prints on printing media with the splice portion SP formed thereon.

(5) Foregoing Embodiments 1 and 2 include the detector SD for detecting a splice portion SP, but this invention does not require the detector SD as indispensable. A construction without the detector SD is as follows, for example. In the following construction, the auto splicer 5 corresponds to the "detector" in this invention.

That is, the controller 11 is connected to the auto splicer 5 to be capable of receiving signals from the auto splicer 5. The auto splicer 5 creates a splice portion SP by uniting the terminal end of the web paper WP from an old roll and the leading end of web paper from a new roll. At this time the auto splicer 5 outputs a splice signal to the computer 11. From this splice signal the computer can recognize an incidence of the splice portion SP on the web paper WP. Based on the length of the transport path from the auto splicer 5 to the drying section 21 and the paper transport speed of the auto splicer 5, the controller 11 controls tension on the transport path to lower the tension for a period of time when the splice portion SP is located in the drying section 21.

According to this construction, the detector SD is formed of the auto splicer 5, which makes the detector SD redundant as a separate entity. Thus, the construction can be simplified to realize reduced cost.

This invention may be embodied in other specific forms without departing from the spirit or essential attributes thereof and, accordingly, reference should be made to the appended claims, rather than to the foregoing specification, as indicating the scope of the invention.

What is claimed is:

1. A printing apparatus for printing on printing media in a continuous form, the printing apparatus comprising:

a transport device for transporting the printing media in a transport direction;

a detector for detecting a splice portion which is a joint between the printing media transported by the transport device;

a printing section for printing on the printing media transported by the transport device;

a drying section for drying at a drying temperature the printing media printed in the printing section and transported by the transport device; and a controller for operating the transport device to reduce tension applied to the splice portion at least while the splice portion is located in the drying section, wherein the transport device comprises a first drive roller located upstream of the drying section in the transport direction and a second drive roller located downstream of the drying section in the transport direction, the first drive roller and the second drive roller both being configured to transport the printing media, wherein the detector is located upstream of the first drive roller in the transport direction, and additionally has a tension sensor located downstream of the first drive roller in the transport direction and upstream of the second drive roller in the transport direction, the tension sensor being configured to detect a tension of the printing media, wherein the controller operates the first drive roller so as to transport the printing media at a constant transporting speed, wherein the controller operates the second drive roller so that a target tension value and a tension detection value of the tension sensor are in agreement with each other, wherein the controller operates the second drive roller so that a tension of the splice portion is in agreement with a target tension value reduced only by a predetermined value from the target tension at least while the splice portion is located in the drying section, and wherein the transport device transports the printing media at the constant transporting speed for a period of time when the splice portion is located in the drying section.

2. The printing apparatus according to claim 1, wherein the controller is configured to operate the transport device to reduce the tension applied to the splice portion at a point of time the splice portion moves out of the printing section.

3. The printing apparatus according to claim 2, further comprising a cooling section disposed downstream of the drying section for cooling the printing media dried in the drying section;

wherein the controller is configured to operate the transport device to reduce the tension applied to the splice portion while the splice portion is located in the cooling section.

4. The printing apparatus according to claim 3, wherein the controller is configured to operate the drying section to lower the drying temperature while the splice portion is located in the drying section.

5. The printing apparatus according to claim 2, wherein the controller is configured to operate the drying section to lower the drying temperature while the splice portion is located in the drying section.

6. The printing apparatus according to claim 1, further comprising a cooling section disposed downstream of the drying section for cooling the printing media dried in the drying section;

wherein the controller is configured to operate the transport device to reduce the tension applied to the splice portion while the splice portion is located in the cooling section.

7. The printing apparatus according to claim 6, wherein the controller is configured to operate the drying section to lower the drying temperature while the splice portion is located in the drying section.

8. The printing apparatus according to claim 6, wherein the controller is configured to operate the transport device to return the tension in the cooling section to a former level after the splice portion passes the cooling section.

9. The printing apparatus according to claim 1, wherein the controller is configured to operate the transport device to return the tension in the drying section to a former level after the splice portion passes the drying section.

10. The printing apparatus according to claim 1, wherein the detector comprises an auto splicer for creating the spliced portion at a joint between old web paper and new web paper, and outputting a splice signal to the controller.

11. The printing apparatus according to claim 1, wherein the controller operates the second drive roller so that a tension of the splice portion is in agreement with the target tension value while the splice portion is located in the printing section, wherein the controller operates the second drive roller so that a tension of the splice portion is in agreement with a target tension value reduced only by a predetermined value from the target tension for a period of time when the splice portion moves out of the printing section, and wherein the transport device transports the printing media at the constant transporting speed for a period of time when the splice portion is located in the printing section and the drying section.

12. A printing apparatus for printing on printing media in a continuous form, the apparatus comprising:

a transport device for transporting the printing media;

a detector for detecting a splice portion which is a joint between the printing media transported by the transport device;

a printing section for printing on the printing media transported by the transport device;

a drying section for drying at a drying temperature the printing media printed in the printing section and transported by the transport device; and a controller for operating the transport device to reduce tension applied to the splice portion at least while the splice portion is located in the drying section, wherein the controller is configured to operate the drying section to lower the drying temperature while the splice portion is located in the drying section.

* * * * *